(12) United States Patent
Shum et al.

(10) Patent No.: US 8,171,112 B2
(45) Date of Patent: *May 1, 2012

(54) CONTENT CHANNELS FOR A MOBILE DEVICE

(75) Inventors: Albert Y. S. Shum, Portland, OR (US); William J. Lauby, Mukilteo, WA (US); Anton O. A. Andrews, Seattle, WA (US); Jonathan R. Harris, Redmond, WA (US); Jeffrey C. Fong, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/028,069

(22) Filed: Feb. 15, 2011

(65) Prior Publication Data

US 2011/0145361 A1 Jun. 16, 2011

Related U.S. Application Data

(63) Continuation of application No. 12/125,938, filed on May 23, 2008, now Pat. No. 7,933,974.

(51) Int. Cl.
*G06F 15/16* (2006.01)
(52) U.S. Cl. ............... 709/219; 709/229; 725/86
(58) Field of Classification Search .................. None
See application file for complete search history.

(56) References Cited

U.S. PATENT DOCUMENTS

| 6,721,489 B1 | 4/2004 | Benyamin et al. |
| 6,965,770 B2 * | 11/2005 | Walsh et al. ............... 455/426.1 |
| 7,103,315 B2 | 9/2006 | Wilkinson |
| 7,136,874 B2 | 11/2006 | Mercer et al. |
| 7,216,008 B2 | 5/2007 | Sakata |
| 7,262,357 B2 | 8/2007 | Plastina et al. |
| 7,933,974 B2 | 4/2011 | Shum et al. |
| 2003/0110503 A1 | 6/2003 | Perkes |
| 2005/0174889 A1 | 8/2005 | Marcantonio et al. |
| 2005/0251566 A1 | 11/2005 | Weel |
| 2006/0059535 A1 | 3/2006 | D'Avello |
| 2006/0062363 A1 * | 3/2006 | Albrett ............... 379/101.01 |
| 2006/0085751 A1 | 4/2006 | O'Brien et al. |
| 2006/0184968 A1 * | 8/2006 | Clayton et al. ............... 725/56 |
| 2006/0206339 A1 | 9/2006 | Silvera et al. |

(Continued)

FOREIGN PATENT DOCUMENTS

WO WO-01035667 5/2001

OTHER PUBLICATIONS

"Apple iPod Touch Media Player", retrieved from <<http://www.zzounds.com/item--APLIPODTOUCH>> on Nov. 29, 2007, zZounds.Music, LLC.,(Aug. 2007),5 Pages.

(Continued)

*Primary Examiner* — Mohamed Ibrahim

(57) ABSTRACT

Various embodiments enable a user of a mobile media device to select one or more channels to load onto the device. Each channel comprises a collection of media content files, such as video content, audio content, and so on. Each collection of media content files can be associated with a particular genre (or genres) of media content. A channel can be managed such that its collection of media content can be rearranged, augmented, and/or otherwise edited to produce a refreshed version of the channel. The refreshed version of the channel can be provided to the mobile media device for playback. Thus, a channel associated with a particular genre of media content can provide a user with a dynamic user experience without requiring the user to manipulate specific media content files.

16 Claims, 6 Drawing Sheets

U.S. PATENT DOCUMENTS

| | | |
|---|---|---|
| 2006/0265091 A1 | 11/2006 | Mihura |
| 2007/0010195 A1* | 1/2007 | Brown et al. ............... 455/3.06 |
| 2007/0011007 A1 | 1/2007 | Greene et al. |
| 2007/0125852 A1 | 6/2007 | Rosenberg |
| 2007/0162395 A1 | 7/2007 | Ben-Yaacov et al. |
| 2007/0168540 A1 | 7/2007 | Hansson |
| 2007/0204311 A1 | 8/2007 | Hasek et al. |
| 2007/0233743 A1 | 10/2007 | Rosenberg |
| 2007/0239849 A1 | 10/2007 | Robbin et al. |
| 2008/0092046 A1 | 4/2008 | Bae |
| 2008/0092168 A1 | 4/2008 | Logan |
| 2008/0108302 A1 | 5/2008 | Linnamaki et al. |
| 2008/0117920 A1 | 5/2008 | Tucker |
| 2008/0268772 A1 | 10/2008 | Linnamaki et al. |
| 2009/0291677 A1 | 11/2009 | Lauby et al. |
| 2009/0293091 A1 | 11/2009 | Shum et al. |

OTHER PUBLICATIONS

"CinemaNow Partners with Samsung to Power Video Download Service fo P2 Portable Media Player", StreamingMedia.com, (Nov. 1, 2007),2 Pages.

"Create and Use Your Own Customized Playlists", Microsoft Corporation,(May 2006),3 Pages.

"Final Office Action", U.S. Appl. No. 12/125,938, (Aug. 6, 2010),14 pages.

"Music Playlist Utility", retrieved from <<http://www.programurl.com/music-playlist-utility.htm>> on Nov. 29, 2007, (Feb. 16, 2004),3 Pages.

"Non Final Office Action", U.S. Appl. 12/125,944, (Dec. 28, 2010),6 pages.

"Non-Final Office Action", U.S. Appl. No. 12/125,938, (Feb. 22, 2010),11 pages.

"Notice of Allowance", U.S. Appl. No. 12/125,938, (Dec. 28, 2010),7 pages.

"Roxio Launches Easy Media Creator 9", Sonic Solutions,(Sep. 5, 2006),2 Pages.

"SYNC", Ford Motor Company,(2007),4 Pages.

"Non-Final Office Action", U.S. Appl. No. 12/125,944, (Nov. 14, 2011), 10 pages.

* cited by examiner

CONTENT CHANNELS FOR A MOBILE DEVICE

RELATED APPLICATIONS

This application is a continuation of, claims priority to, and incorporates by reference in its entirety, co-pending U.S. patent application Ser. No. 12/125,938, filed May 23, 2008, entitled "Media Content for a Mobile Media Device".

BACKGROUND

There is a wide availability of different types of media content for mobile media devices, such as audio content, video content, and the like. While most individuals are interested in taking advantage of this availability of media content, many of the currently available mobile media devices present significant barriers to some user's potential enjoyment of such content. These barriers can exist in the acquisition of, loading of, and/or access to media content. For example, some mobile media devices require users to engage in time-intensive setup procedures and navigate cumbersome user interfaces before the device can be loaded with media content and utilized to enjoy the content. Some other devices are simpler but provide users with little or no control over media playback and simply provide a user with a single "bucket" of content to be played with no particular rhyme or reason with respect to the order in which the media content is played. Because of these barriers, many users fail to enjoy their interaction with mobile media devices, or simply avoid mobile media devices altogether.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Various embodiments enable a user of a mobile media device to select one or more channels to load onto the device. Each channel comprises a collection of media content files, such as video content, audio content, and so on. Each collection of media content files can be associated with a particular genre (or genres) of media content. A channel can be managed such that its collection of media content can be rearranged, augmented, and/or otherwise edited to produce a refreshed version of the channel. A channel can be refreshed in response to the mobile media device being connected to a particular resource, such as a desktop PC, a laptop, and so on. The refreshed version of the channel can be provided to the mobile media device for playback. Thus, a channel associated with a particular genre of media content can provide a user with a dynamic user experience without requiring the user to manipulate specific media content files.

BRIEF DESCRIPTION OF THE DRAWINGS

The same numbers are used throughout the drawings to reference like features.

DETAILED DESCRIPTION

Overview

Figure 1:
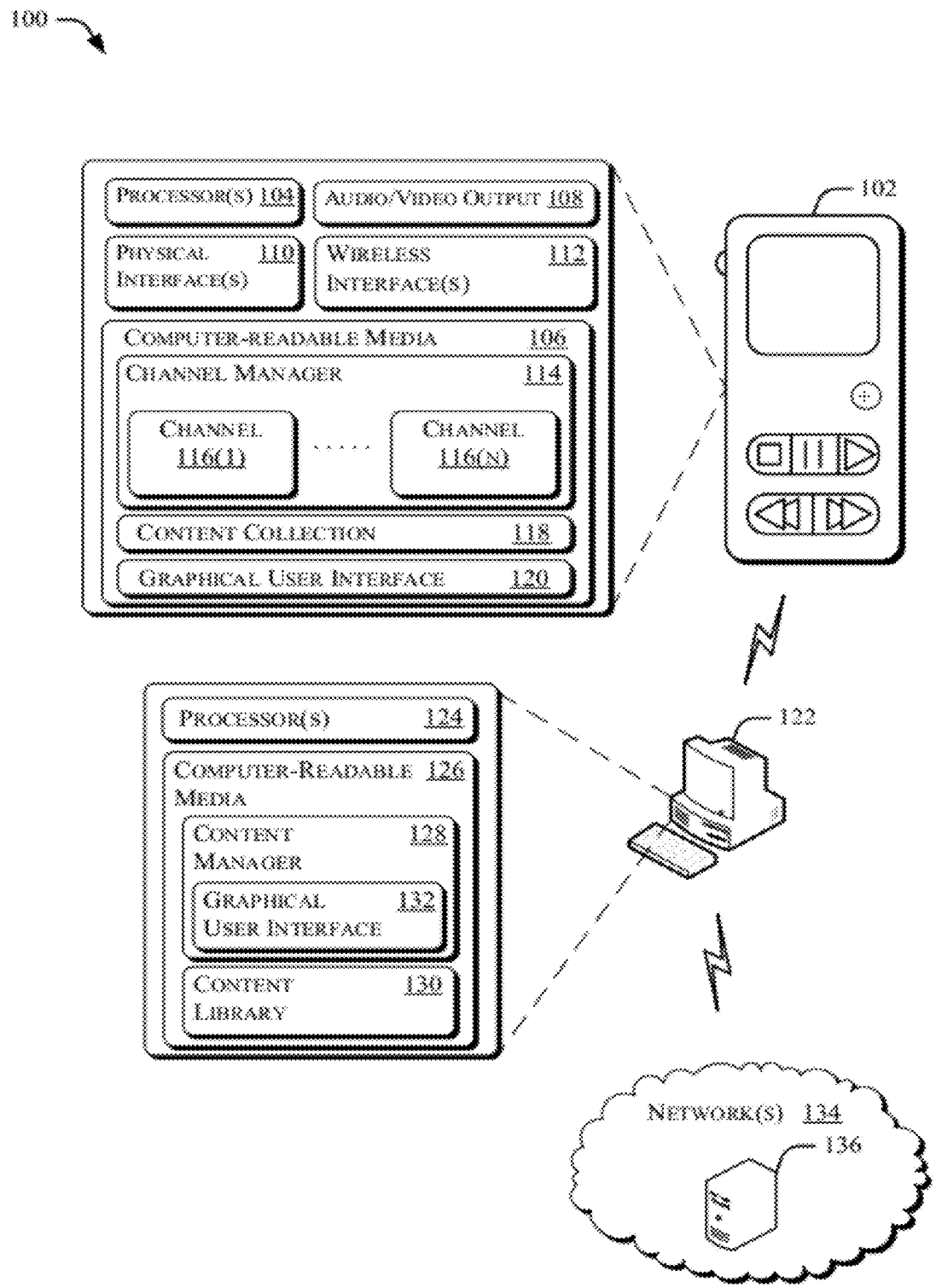
FIG. 1 illustrates an operating environment in which various principles and techniques described herein for the management of media content can be employed in accordance with one or more embodiments.

Various embodiments provide media content users with a robust end-to-end media content experience. Some embodiments enable a user of a mobile media device to configure the device to play media content that is preferred by the user. In one embodiment, a user interacts with a channel management service and/or a content management application to load one or more preconfigured channels onto a mobile media device. A channel comprises a collection of media content files, such as video content, audio content, podcasts, pictures, information feeds, text files, and so on. Each channel and its collection of media content files can be associated with a particular genre of media content, artist, period, geographical region, and so on. In some embodiments, a user can select, preview, and play back a channel on a client device (e.g., a desktop PC) that is capable of hosting a mobile media device. This can enable a user to preview a channel before loading onto a mobile media device. For a mobile media device that is wireless-enabled, a channel may include a content feed (e.g., a live content feed) from a radio station or other wireless content source.

A channel also includes a channel metafile that comprises channel-specific data, such as a channel genre, the entity that created the channel, and so on. The channel metafile includes pointers to each of the individual media content files that are to be used to compose a channel.

A channel can be managed such that its collection of media content can be rearranged, augmented, and/or otherwise edited to produce a refreshed version of the channel. Channel management can be performed by one or more channel management services that provide channels and other media content to media content consumers. A user of a mobile media device can access a channel management service via a network (e.g., the Internet) to receive a new channel and/or a refreshed version of a channel that the user has already loaded on the user's mobile media device. A channel management service can produce a refreshed version of a channel when new content becomes available and/or based on the preferences of an individual (e.g., the user of the mobile media device, a disc jockey, and so on) that manages the channel. A variety of different techniques for refreshing a channel can be utilized, such as refreshing channels on a periodic basis, customized refresh rates, and/or media content injection into a channel from one or more media content sources. Thus, certain embodiments enable a user to select channels to load onto a mobile media device without requiring the user to create playlists or download individual media content files or albums.

In one example, a particular channel includes news-related media content. When the channel is refreshed, outdated news is deleted from the channel and up-to-date news is added to the channel. Thus, a channel management service can create a refreshed version of the channel, and when the channel is refreshed on a mobile media device, a previous version of the channel is replaced with the refreshed version. In this case of a news channel, this enables a user to have access to the latest news via the user's mobile media device.

A channel can be refreshed in response to the mobile media device being connected to a particular resource, such as a desktop PC, a laptop, and so on. The refreshed version of the channel can be provided to the mobile media device for playback. Thus, a channel can provide a user with a dynamic media content experience without requiring the user to manipulate specific media content files.

In the discussion that follows, a section entitled "Operating Environment" is provided and describes an environment in which one or more embodiments can be employed. Following this, a section entitled "Mobile Media Device" is provided and describes particular aspects of one embodiment of a mobile media device. After this, a section entitled "Graphical User Interface" is presented, which discusses one embodiment of a graphical user interface that can implement techniques and principles discussed herein. Finally, a section entitled "Example Processes" is provided and describes three processes that can implement various principles and techniques discussed herein.

Operating Environment

FIG. 1 illustrates an operating environment in accordance with one or more embodiments, generally at 100. Environment 100 includes a mobile media device 102 having one or more processors 104 and one or more computer-readable media 106.

Mobile media device 102 also includes audio/video output devices 108, physical interface(s) 110, and wireless interface(s) 112. Examples of audio/video output devices 108 include audio speakers, a display screen (e.g., an LCD touch screen), LED indicators, and so on. Physical interface(s) 110 enable mobile media device 102 to physically interface with another device and/or resource and exchange data or other signal types. Examples of physical interface(s) 110 include, but are not limited to, a USB port, a USB plug, an Ethernet port, an analog audio input/output, and so on. Wireless interface(s) 112 enable mobile media device 102 to connect to a remote device or resource via a wireless connection. Examples of wireless interface(s) 112 include, but are not limited to, a Wi-Fi interface, an RF interface, an IR interface, and so on.

Stored on computer-readable media 106 are a variety of modules that perform various functionalities for mobile media device 102. A channel manager 114 handles channel-related actions for the device, including loading a new channel, deleting a channel, refreshing a channel, and so on. Channel manager 114 includes a plurality of channels, shown here as channel 116(1) through channel 116(n). Two channels are illustrated here for purposes of this example embodiment only, and other embodiments of mobile media device 102 can store any suitable number of channels.

Also stored on computer-readable media 106 is a content collection 118 that can include a variety of different media content, such as content that is loaded at the time of manufacture of mobile media device 102, content that is loaded by the user, and so on. The media content in content collection 118 can include audio content, video content, and so on, and can be accessed by channel manager 114 to augment and/or otherwise customize a channel.

Computer-readable media 106 also stores a graphical user interface (GUI) 120 that can display media content and/or content-related information. In some embodiments, GUI 120 can include touch-screen functionality such that input can be provided to mobile media device 102 via physical interaction with a display generated by GUI 120.

Environment 100 also includes a computing device 122, which can be embodied as any suitable computing device such as, by way of example and not limitation, a desktop computer, a portable computer, or a handheld computer such as a personal digital assistant (PDA), cell phone, and the like. Computing device 122 is configured such that it can interface with mobile media device 102, e.g., via physical interface(s) 110 and/or wireless interface(s) 112.

Computing device 122 includes one or more processor(s) 124 and one or more computer-readable media 126. Stored on computer-readable media 126 are a content manager 128 and a content library 130. Content manager 128 handles a variety of media content transactions for mobile media device 102 and includes a graphical user interface 132 to facilitate these transactions. Content library 130 stores media content that can be loaded onto the mobile media device, and can store a variety of content, including channels and/or discrete media content files.

Environment 100 also includes a network 134, which can comprise any suitable network, such as a local access network (LAN), a wide area network (WAN), the Internet, and so on. As part of network 134 is a remote resource 136. While remote resource 136 is illustrated here as a server tower, this is not intended to be limiting, and remote resource 136 can include any suitable computing and/or storage resource or set of resources. Among other possible functions, remote resource 136 can act as a media content source and provide channel management services for computing device 122 and/or mobile media device 102. In one example, remote resource 136 hosts a web-based channel management service that creates channels, updates/refreshes channels, and makes new channels and/or refreshed channels available to a user of a mobile media device.

Mobile Media Device

Figure 2:
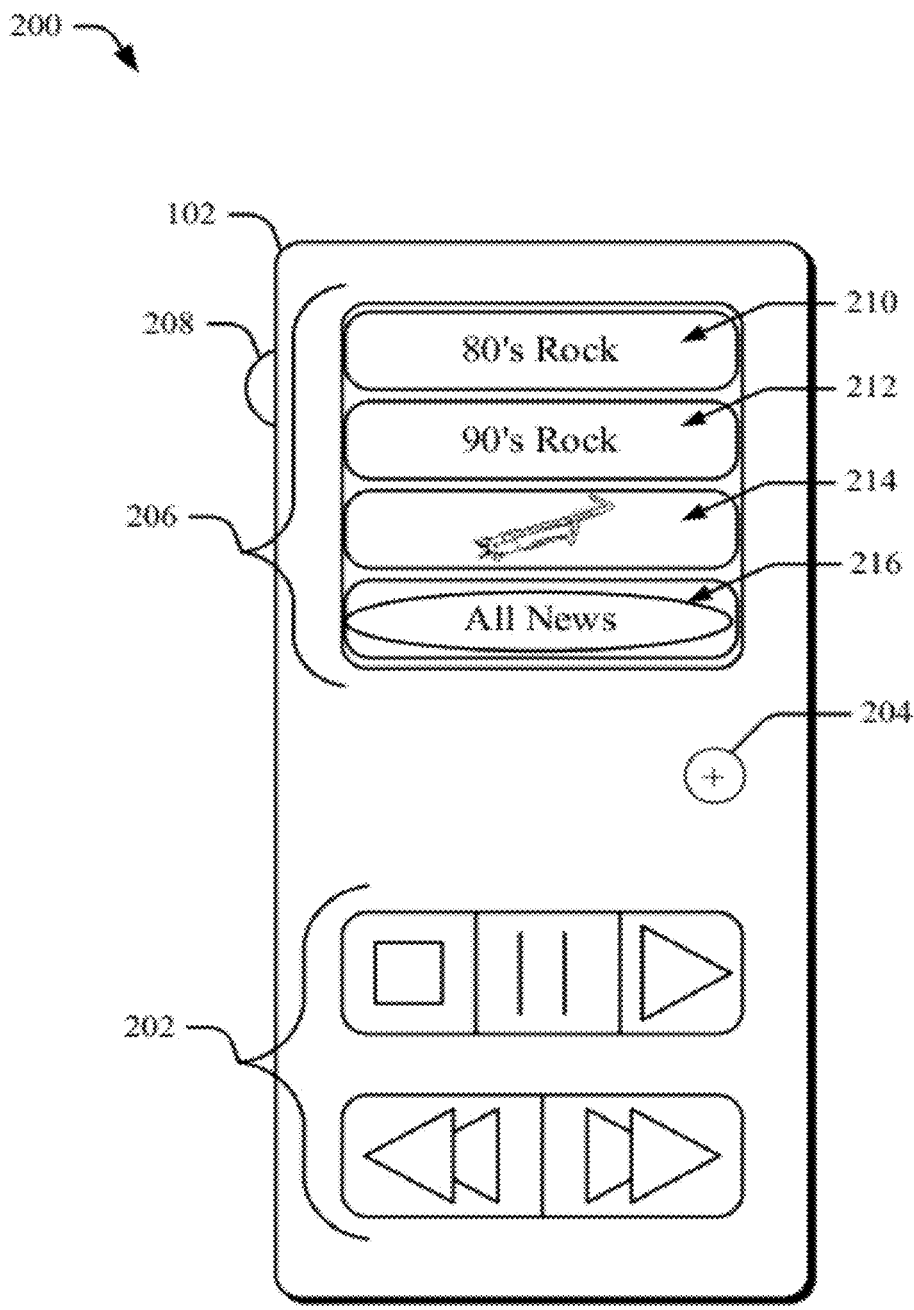
FIG. 2 illustrates one embodiment of a mobile media device that can implement various principles and techniques described herein.

FIG. 2 illustrates at 200 certain aspects of mobile media device 102. Mobile media device 102 is presented for purposes of example only, and a wide variety of different mobile media device configurations may be utilized without departing from the spirit and scope of the claimed embodiments.

Mobile media device 102 includes navigation controls 202, a power button 204, a display screen 206, and a selector button 208. Navigation controls 202 include a variety of selectable controls that enable a user to navigate media content stored on the device. In the illustrated example, navigation controls 202 include a stop button, a pause button, a play button, a rewind/skip back button, and a fast forward/skip forward button. Power button 204 enables a user to power on and power off mobile media device 102. Display screen 206 can utilize any suitable graphical display technology (e.g., LCD) and is configured to graphically display media content and/or data related to media content.

Selector button 208 can be configured to perform a variety of different functions for mobile media device 102. In one embodiment, selector button 208 is a scroll button that can be utilized to scroll from one channel to another and/or from one media content file to another media content file within a channel. In some embodiments, selector channel 208 can be configured by a user to perform one or more functions (e.g., navigation functions, audio volume, and so on) on mobile media device 102.

Although mobile media device 102 is illustrated with several navigation controls, other embodiments may utilize a more simplified form to create a less complicated user experience. For example, one embodiment of mobile media device 102 may be manufactured without navigation controls 202, e.g., a user could navigate through channels and/or media content files using selector button 208. In such embodiments, selector button 208 can be configured to enable a user to skip forward through channels and/or media content files. If a user wishes to skip forward to a subsequent channel, the user would hold selector button 208 for a specific period of time (e.g., for more than three seconds). Alternatively, if a user wishes to skip forward from one media content file to another, the user would click selector button 208 (e.g., the user would hold the button for three seconds or less). Other methods of input to mobile media device 102 may be utilized, such as audio input, tactile input (e.g., via a touch screen), motion-related input (e.g., shaking and/or positioning the device in a certain way), and so on. Using these alternative methods of input can enable a very simple form of mobile media device to be created, one that has no external controls and/or display. A user could simply provide tactile and/or motion related input to the device to activate particular device functionalities.

Four channel icons are displayed on display screen 206: a channel icon 210; a channel icon 212; a channel icon 214; and a channel icon 216. Each channel icon is a graphical representation of a channel that is loaded on mobile media device 102, and each channel represents a particular collection of media content files. Channel icon 210 represents an "80's Rock" channel, which is a collection of media content files that are associated with a genre of music known as "80's Rock" (e.g., media content associated with rock and roll music from the era of the 1980's). Channel icon 212 represents a "90's Rock" channel.

Channel icon 214 displays an image of a saxophone. In some embodiments, a channel icon can contain a pictorial representation of a particular a channel and can also provide a pictorial representation of the channel. In another example, a user of mobile media device 102 can select an image to be used to represent a particular channel. In this example, channel icon 214 represents a jazz channel, and an image of a saxophone is displayed on the channel icon to indicate that the channel is a jazz channel.

Channel icon 216 represents an "All News" channel. This channel is a collection of media content that would fall under the category of general news information (e.g., current events in a variety of subject areas, such as politics, sports, business, and so on). As indicated by the oval shape overlaying channel icon 216, the "All News" channel is currently selected for playback on mobile media device 102. As discussed above, channels may be selected for playback by scrolling through the channels via selector button 208. As channels are selected for playback, a graphical representation will indicate that a particular channel is currently selected, such as the oval illustrated here. A wide variety of graphical representations and indications may be utilized without departing from the spirit and scope of the claimed embodiments.

This discussion of channels and channel management concepts with reference to a mobile media device is not intended to preclude the use of desktop computers, gaming systems, and other "less mobile" devices to experience channel-based media content. In some embodiments, a user can use a desktop computer to view, select, investigate, sample, and/or play back one or more channels. Thus, the channels and channel management concepts discussed herein are applicable to a wide variety of platforms and devices, including mobile and non-mobile devices.

Graphical User Interface

Figure 3:
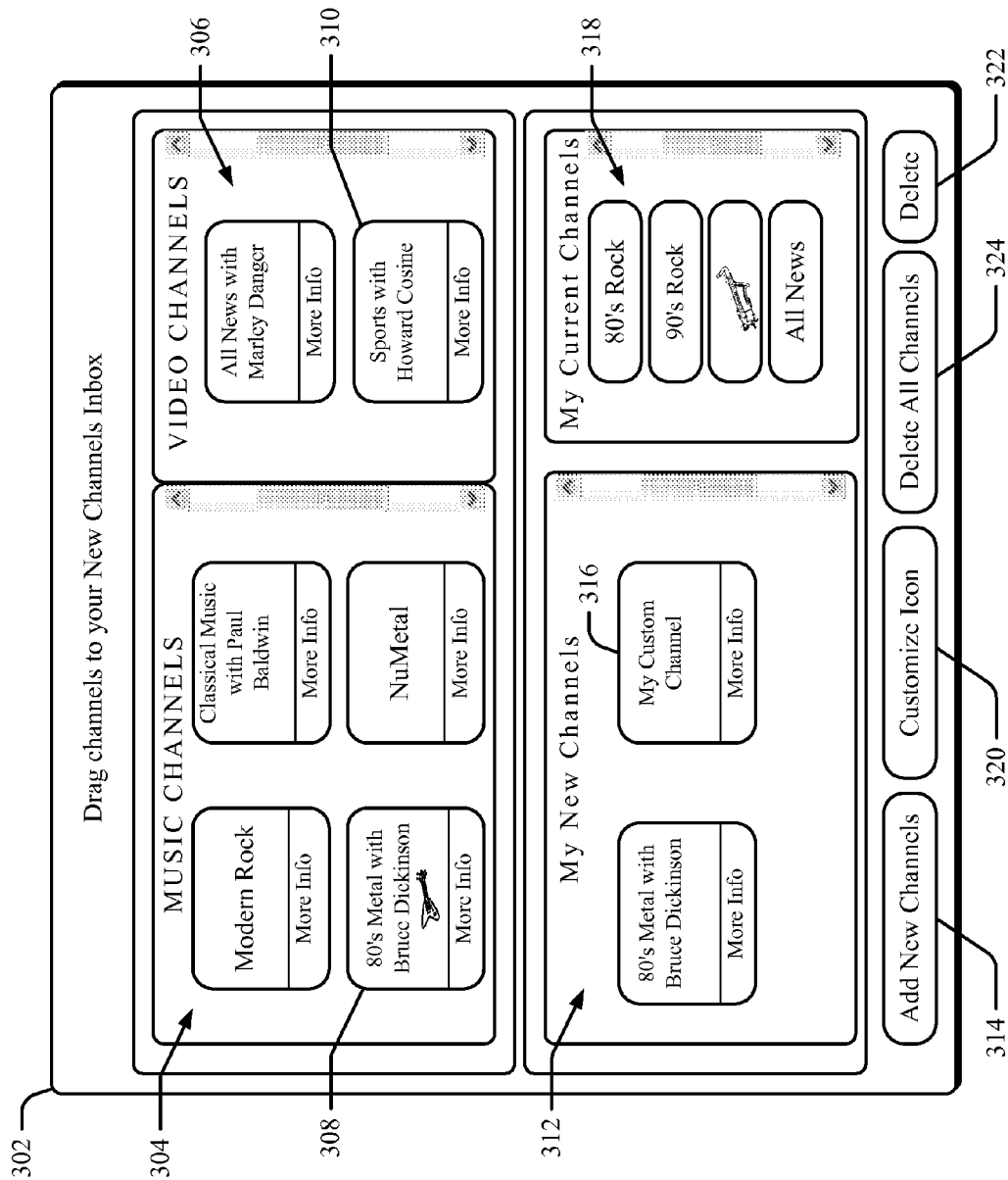
FIG. 3 illustrates one example of a graphical user interface that can implement various principles and techniques described herein and in accordance with one or more embodiments.

FIG. 3 illustrates an example graphical user interface (GUI) 302 that can implement one or more aspects of the techniques and processes discussed herein. GUI 302 can be displayed on a computing device (e.g., computing device 122) that is connected to or is otherwise being used to manage a mobile media device. GUI 302 includes a music channel menu 304 and a video channel menu 306. These channel menus include channel menu icons (e.g., a channel menu icon 308) that represent channels that can be loaded onto a mobile media device.

Channel menu icon 308 represents a channel designated as "80's Metal with Bruce Dickinson", which is a collection of media content files (e.g., audio files) that are associated with the genre of heavy metal music from the era of the 1980's. This channel also has a DJ named Bruce Dickinson, who is responsible for selecting and/or arranging media content for the channel. The DJ can provide commentary for the channel, such as historical and/or biographical information about the content and the artists associated with the channel's media content. Also shown as part of channel menu icon 308 is a "More Info" area that can be selected to provide more information about the channel represented by the icon.

Video channel menu 306 includes a channel menu icon 310, which represents a channel designated as "Sports with Howard Cosine". This channel is a collection of media content files (including video files) that are associated with sports and sports-related information. As with channel menu icon 308, channel menu icon 310 has a "More Info" area that can be selected to provide more information about the channel represented by the icon.

GUI 302 also includes a channel inbox 312, which is populated with channel menu icons for channels that a user wishes to load onto a mobile media device. In one embodiment, a user drags a channel menu icon from a music channel menu and/or a video channel menu to channel inbox 312. The channel menu icon is "staged" in the channel inbox until the user is finished selecting channels to load. The user then selects an add button 314 to load one or more channels from channel inbox 312 to a mobile media device. In some embodiments, selecting add button 314 initiates a synchronization process whereby one or more channels are written to the memory of a mobile media device.

Also displayed in channel inbox 312 is one example of a custom channel icon 316 that represents a custom channel containing particular media content files selected by the user. The user can select individual songs, videos, and/or other media content files to populate the custom channel. The media content files can be selected from a web-based collection of media content or from a source local to the user, such as a CD or other data storage medium. Media content files can also be selected and obtained from another wireless connected device.

A current channels menu 318 is also included as part of GUI 302. Current channels menu 302 includes a list of channels currently loaded on a mobile media device that is managed via GUI 302. Thus, when a user connects a mobile media device to a computing device (such as a desktop PC), a media content management application can be launched (e.g., content manager 128) that generates GUI 302. The computing device reads the mobile media device's memory and populates current channels menu 318 with a list of channels stored on the mobile media device. If a user adds and/or deletes channels from a mobile media device during a channel management session, current channels menu 318 will be updated to reflect these additions and/or deletions.

A customize icon button 320 can be selected to activate functionality to enable a user to customize a channel icon for the user's mobile media device. For example, selecting customize icon button 320 may generate a window with graphical images that can be selected to be displayed on a particular channel icon. Thus, a user can supplement or replace the text and/or image displayed on a channel icon with a graphical image and/or text of the user's own choosing. When the channel is transferred to the user's mobile media device, the graphical image and/or text chosen by the user is automatically transferred to the corresponding channel icon on the user's device.

GUI 302 also includes a delete button 322 and a delete all channels button 324. A user can select one or more channels from current channels menu 318 and then select delete button 322 to remove the channel from the mobile media device. If a user wishes to delete all of the channels currently stored on a mobile media device, the user can select delete all channels button 324 to delete all of the channels currently stored on the device.

Example Processes

Figure 4:
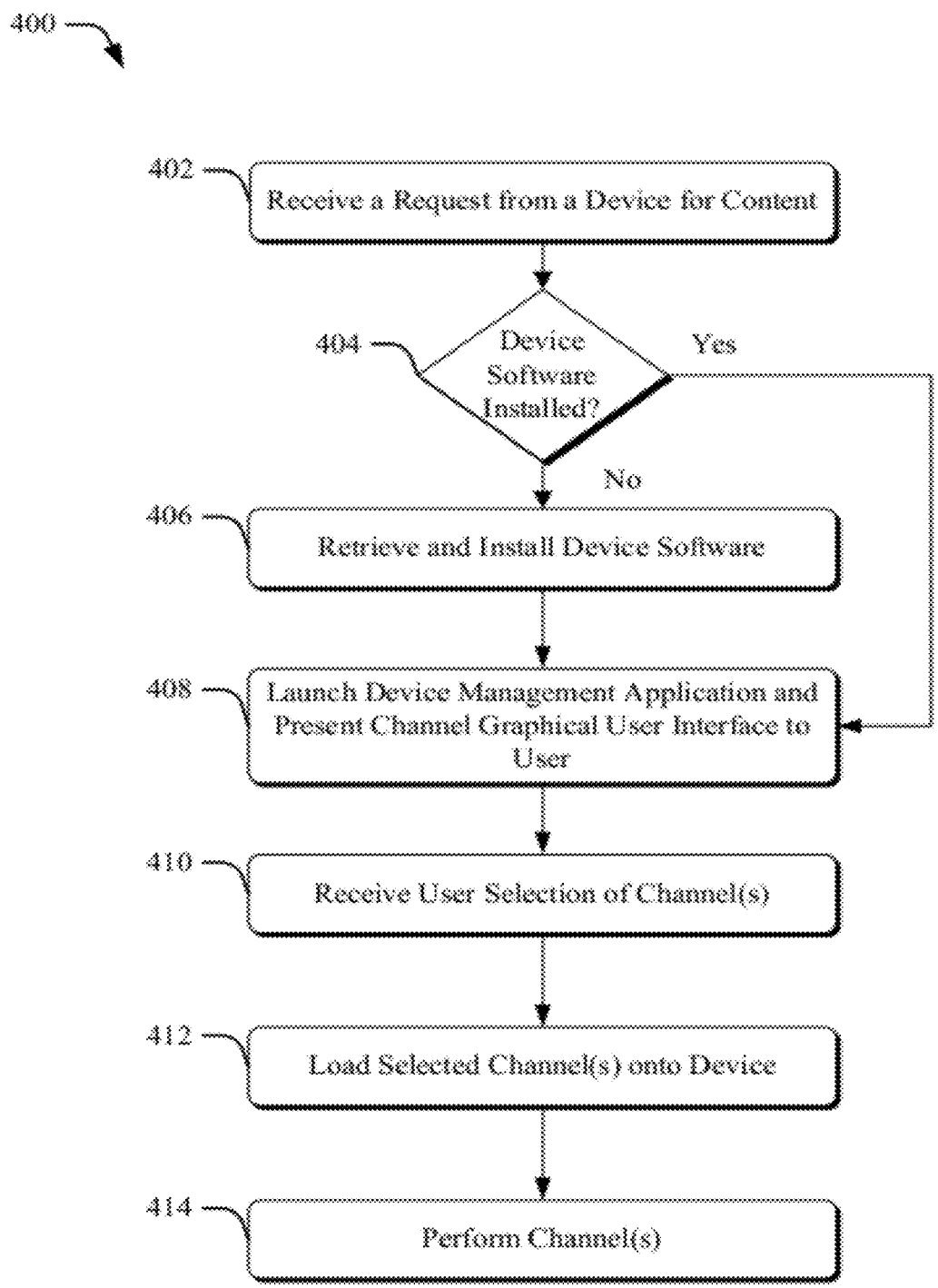
FIG. 4 is a flow diagram of a process for loading channels on a mobile media device according to various principles and techniques described herein in accordance with one or more embodiments.
Figure 5:
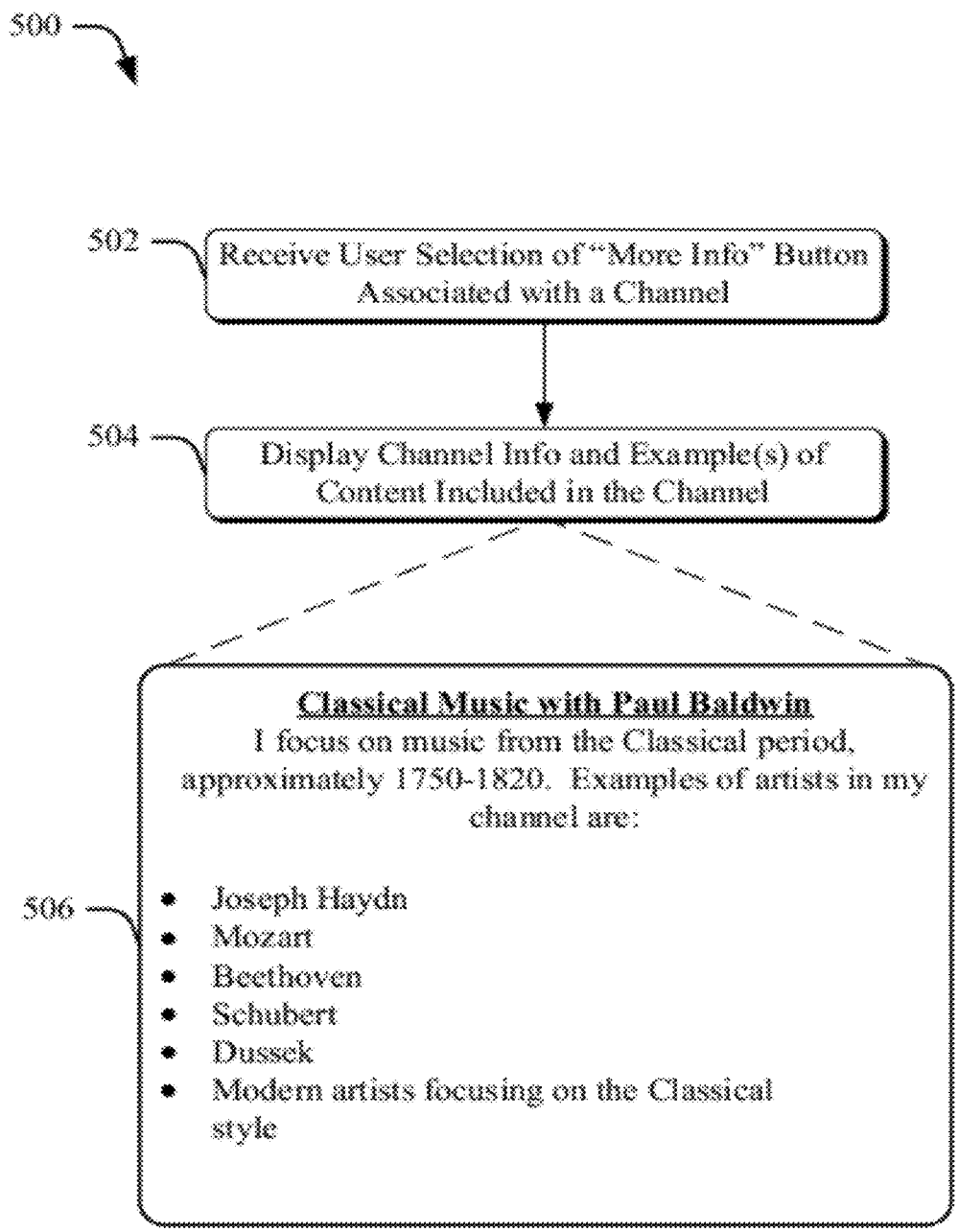
FIG. 5 is a flow diagram of a process for obtaining information about a channel that utilizes various principles and techniques described herein in accordance with one or more embodiments.
Figure 6:
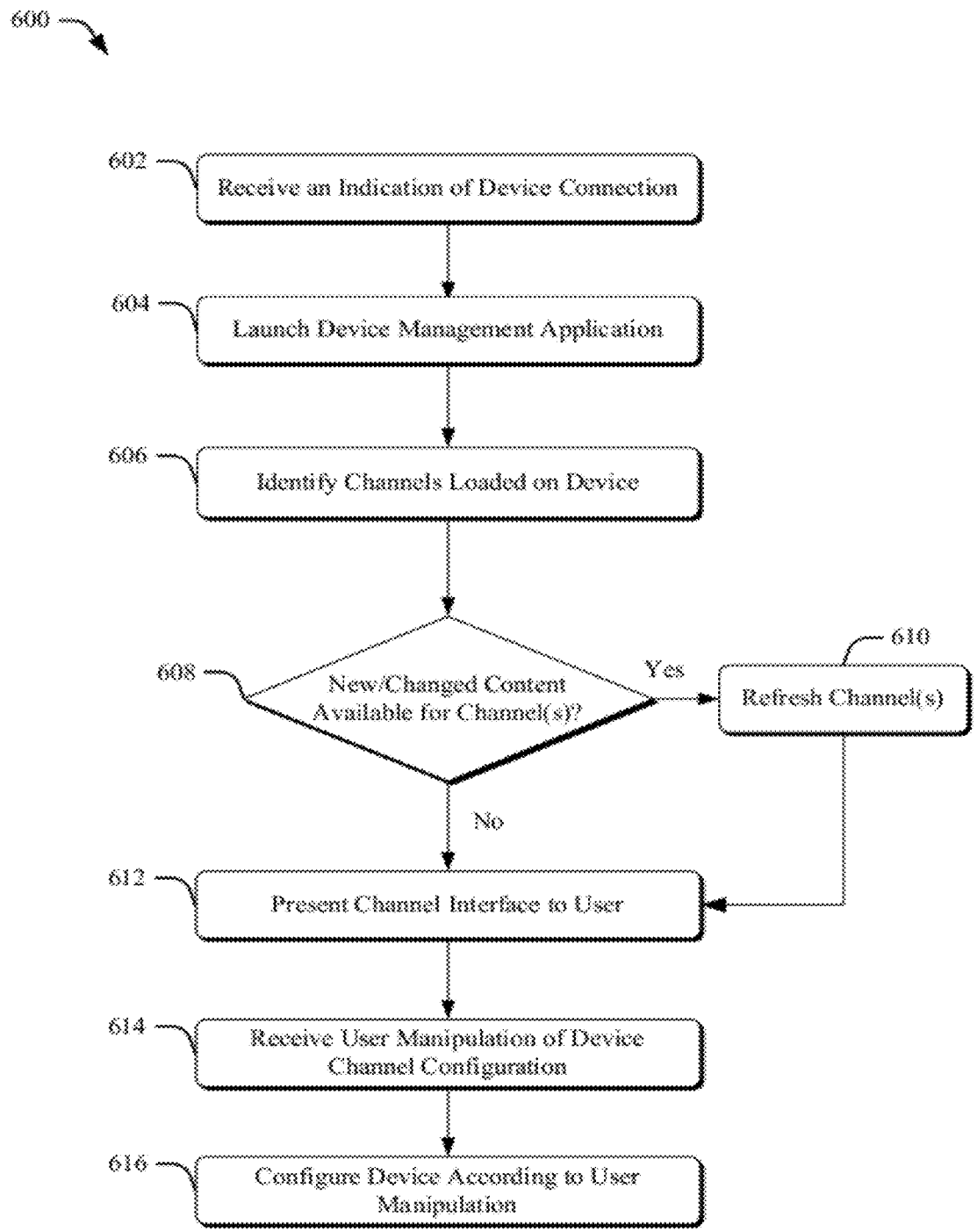
FIG. 6 is a flow diagram of a process for obtaining a refreshed version of a channel that utilizes various principles and techniques described herein in accordance with one or more embodiments.

FIGS. 4-6 illustrate examples of processes that implement aspects of the principles and techniques discussed herein. These processes can be implemented in connection with any suitable hardware, software, firmware, or combination thereof.

FIG. 4 illustrates a flow diagram 400 that represents one process for populating a mobile media device with one or more channels. At 402, a request for media content is received from a mobile media device. The request can be received at a computing device (such as computing device 122 and/or remote resource 136) and in response to the mobile media device being connected to the computing device. At 404, the computing device determines if a device management application is installed (e.g., content manager 128) that enables media content to be loaded onto the mobile media device. If a device management application is not installed, at 406 the application is retrieved and installed. In one embodiment, the device management application is provided on some type of external storage medium, such as a compact disc, a flash drive, and so on. Additionally and/or alternatively, the device management application is downloaded from a remote resource via a network, such as the Web. In another embodiment, the application is stored on the mobile media device itself and is retrieved from the mobile media device and installed onto the computing device.

If a device management application is already installed, or once it is installed, at 408 the application is launched and a graphical user interface (e.g., GUI 302) is presented that enables a user to select one or more channels to be loaded onto the mobile media device. At 410, a user selection of a channel is received and at 412, the selected channel is loaded onto the mobile media device. At 414, one or more channels are performed (e.g., played back) by the mobile media device.

In another example embodiment, when a request for media content is received from the mobile media device, the device is automatically populated with one or more channels without requiring the user to select any channels. This enables a user to simply connect the user's mobile media device to a channel management service and automatically receive channels without the need to interact with the service. Channels can be selected based on a variety of criteria, such as the most popular channels, the newest channels, and/or based on media content that the user has stored on the mobile media device or on the user's personal computer.

FIG. 5 illustrates a flow diagram that represents a process 500 for presenting a user of a mobile media device with more information about a channel in accordance with one or more embodiments. At 502, a user selection of a "More Info" region or button associated with a channel is received (e.g., such as that illustrated by channel menu icon 308). At 504, information is presented to the user concerning the channel. The information can be presented to the user in a variety of forms, such as a channel information window 506 that contains a variety of different information about the channel. As illustrated, channel information window 506 includes a description of the media content associated with the channel (e.g., the genre "Classical Music") and a few examples of the artists and/or content represented in the channel.

FIG. 6 illustrates a flow diagram that represents a process 600 for refreshing one or more channels that are loaded on a mobile media device in accordance with one or more embodiments. At 602, an indication is received that the mobile media device is connected to a computing device. When the mobile media device is connected to the computing device, a connectivity session is initiated. A connectivity session refers to a condition of the mobile media device where the mobile media device is connected to the computing device (or any other suitable device). Thus, when the mobile media device is disconnected from the computing device, the connectivity session is terminated.

At 604, a device management application (e.g., content manager 128) is launched on the computing device. At 606, the device management application accesses the mobile media device and identifies one or more channels that are loaded on the mobile media device. The device management application then determines at 608 if there is new media content available for one of the channels and/or if a new arrangement of media content is available for one of the channels. If there is new media content and/or a new arrangement of media content available for a channel, at 610 the channel stored on the mobile media device is refreshed to include the new content and/or the new arrangement of content.

At 612 a channel user interface (e.g., GUI 302) is presented to the user and at 614, the user's manipulation of the mobile media device's channel configuration and/or media content configuration is received. This manipulation can include the addition and/or deletion of channels from the mobile media device, as well as the addition and/or deletion of individual media content files from the mobile media device. At 616, the mobile media device is configured according to the user's manipulation of the channels and/or media content.

In some embodiments, one or more actions that occur during process 600 can be performed automatically by the computing device in response to the mobile media device being connected to the computing device. For example, when a user connects the mobile media device to the computing device, the computing device can automatically launch the device management application, identify channels loaded on the device, determine if new and/or changed media content is available for a channel, refresh a channel, and/or present the channel user interface to the user, all without requiring user interaction.

Various techniques may be described herein in the general context of software or program modules. Generally, software includes routines, programs, objects, components, data structures, and so forth that perform particular tasks or implement particular abstract data types. An implementation of these modules and techniques may be stored on or transmitted across some form of computer-readable media. Computer-readable media can be any available medium or media that can be accessed by a computing device. By way of example, and not limitation, computer readable media may comprise "computer storage media".

"Computer storage media" include volatile and non-volatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

Conclusion

The above-described principles and techniques provide users of mobile media devices with an easily-accessible and dynamic media content experience. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method comprising:
receiving, at a channel management service, a content request from a mobile device;
responsive to receiving the content request, causing the mobile device to replace a first instance of a selected channel with a second instance of the selected channel by loading content files from a second collection of content files associated with the second instance of the selected channel that are not in a first collection of content files associated with the first instance of the selected channel onto the mobile device, the loading causing content files from the first collection of content files that are not in the second collection of content files to be removed from the mobile device, the second instance of the selected channel including a metafile that comprises channel description information and pointers to each of the content files comprised by the second instance of the selected channel.

2. The computer-implemented method as recited in claim 1, wherein the content request is generated responsive to the mobile device being wirelessly connected to the channel management service over a network.

3. The computer-implemented method as recited in claim 2, wherein the channel management service is located at a remote server, and wherein the network comprises the Internet.

4. The computer-implemented method as recited in claim 1, wherein the content request is generated responsive to the mobile device being wirelessly connected to a computing device.

5. The computer-implemented method as recited in claim 4, wherein the computing device comprises a desktop PC, a laptop, or a game console.

6. The computer-implemented method as recited in claim 1, wherein the content request is generated responsive to the mobile device being directly connected to a computing device via a wired connection.

7. The computer-implemented method as recited in claim 6, wherein the computing device comprises a desktop PC, a laptop, or a game console.

8. A computer-implemented method comprising:
requesting a new instance of a selected channel;
receiving content files from a new collection of content files associated with the new instance of the selected channel from a channel management service; and
replacing, on a mobile device, a current instance of the selected channel with the new instance of the selected channel by loading the content files from the new collection of content files associated with the new instance of the selected channel that are not in a current collection of content files associated with the current instance of the selected channel onto the mobile device and removing content files from the current collection of content files that are not in the new collection of content files from the mobile device, the new instance of the selected channel including a metafile that comprises channel description information and pointers to each of the content files comprised by the new instance of the selected channel.

9. The computer-implemented method as recited in claim 8, wherein requesting the new instance of the selected channel is performed responsive to the mobile device being wirelessly connected to the channel management service over a network.

10. The computer-implemented method as recited in claim 9, wherein the channel management service is located at a remote server, and wherein the network comprises the Internet.

11. The computer-implemented method as recited in claim 8, wherein requesting the new instance of the selected channel is performed responsive to the mobile device being wirelessly connected to a computing device.

12. The computer-implemented method as recited in claim 11, wherein the computing device comprises a desktop PC, a laptop, or a game console.

13. The computer-implemented method as recited in claim 8, wherein requesting the new instance of the selected channel is performed responsive to the mobile device being directly connected to a computing device via a wired connection.

14. The computer-implemented method as recited in claim 13, wherein the computing device comprises a desktop PC, a laptop, or a game console.

15. A mobile device comprising:
a processor; and
one or more computer-readable storage media having computer-executable instructions stored thereon that, when executed by the processor, implement a method comprising:
requesting a new instance of a selected channel;
receiving content files from a new collection of content files associated with the new instance of the selected channel from a channel management service; and
replacing, on the mobile device, a current instance of the selected channel with the new instance of the selected channel by loading the content files from the new collection of content files associated with the new instance of the selected channel that are not in a current collection of content files associated with the current instance of the selected channel onto the mobile device and removing content files from the current collection of content files that are not in the new collection of content files from the mobile device, the new instance of the selected channel including a metafile that comprises channel description information and pointers to each of the content files comprised by the new instance of the selected channel.

16. The mobile device as recited in claim 15, wherein requesting the new instance of the selected channel is performed responsive to the mobile device being wirelessly connected to the channel management service over a network.

* * * * *

UNITED STATES PATENT AND TRADEMARK OFFICE
CERTIFICATE OF CORRECTION

| | | |
|---|---|---|
| PATENT NO. | : 8,171,112 B2 | Page 1 of 1 |
| APPLICATION NO. | : 13/028069 | |
| DATED | : May 1, 2012 | |
| INVENTOR(S) | : Albert Y. S. Shum et al. | |

It is certified that error appears in the above-identified patent and that said Letters Patent is hereby corrected as shown below:

In column 5, line 41, after "particular" insert -- channel. For example, a DJ (disc jockey) or VJ (video jockey) can provide content for --.

Signed and Sealed this
Twenty-sixth Day of June, 2012

David J. Kappos
*Director of the United States Patent and Trademark Office*